(12) United States Patent
Siebenbrodt et al.

(10) Patent No.: US 11,002,310 B2
(45) Date of Patent: May 11, 2021

(54) ROLLING-ELEMENT BEARING UNIT AND TAPERED-ROLLER-BEARING INNER RING

(71) Applicant: AKTIEBOLAGET SKF, Gothenburg (SE)

(72) Inventors: Ralf Siebenbrodt, Lüchow (DE);
Volker Wendt, Üchtelhausen/Zell (DE);
Karsten Zuhl, Lüchow (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/703,181

(22) Filed: Dec. 4, 2019

(65) Prior Publication Data
US 2020/0224717 A1    Jul. 16, 2020

(30) Foreign Application Priority Data

Jan. 11, 2019   (DE) .......................... 102019200297.8

(51) Int. Cl.
*F16C 19/36*    (2006.01)
*F16C 33/58*    (2006.01)
*F16C 33/78*    (2006.01)

(52) U.S. Cl.
CPC .......... *F16C 19/364* (2013.01); *F16C 33/585* (2013.01); *F16C 33/7813* (2013.01)

(58) Field of Classification Search
CPC .... F16C 19/364; F16C 19/385; F16C 19/386; F16C 33/585; F16C 33/7813; F16C 33/586
See application file for complete search history.

(56) References Cited

U.S. PATENT DOCUMENTS

| 2,277,979 | A  | * | 3/1942 | Horger | ................... 277/411 |
| 6,379,049 | B1 | * | 4/2002 | Shibazaki | ............ F16C 19/225 |
|  |  |  |  |  | 384/450 |
| 8,899,839 | B2 | * | 12/2014 | Liang | .............. F16C 33/366 |
|  |  |  |  |  | 384/564 |

FOREIGN PATENT DOCUMENTS

| DE | 102017108365 | * | 10/2018 |
| JP | 2011-163454 | * | 8/2011 |

* cited by examiner

*Primary Examiner* — James Pilkington
(74) *Attorney, Agent, or Firm* — J-TEK Law PLLC; Scott T. Wakeman; Mark A. Ussai

(57) ABSTRACT

A rolling-element bearing unit includes at least one outer ring and at least one inner ring, and a plurality of rolling elements between the at least one outer ring and the at least one inner ring. The inner ring has a surface, which may be cylindrical, at an axial end region of the rolling-element bearing unit which surface is configured to contact a seal element. A projection extends radially outwardly from the surface at an angle and forms a guide surface facing the plurality of rolling elements.

10 Claims, 3 Drawing Sheets

ROLLING-ELEMENT BEARING UNIT AND TAPERED-ROLLER-BEARING INNER RING

CROSS-REFERENCE

This application claims priority to German patent application no. 10 2019 200 297.8 filed on Jan. 11, 2019, the contents of which are fully incorporated herein by reference.

TECHNOLOGICAL FIELD

The disclosure is directed to a rolling-element bearing unit having improved axial support for rolling elements.

BACKGROUND

A known rolling-element bearing unit (see FIG. 1) includes an outer ring 10, an inner ring 12, and a number of rolling elements 14 that contact the outer ring and the inner ring. The inner ring comprises a surface 16 against which a seal element 18 abuts and that is disposed at an axial end region of the rolling-element bearing unit. In order to extend a service life of the rolling-element bearing unit, a new lubricating is effected at relatively short time intervals. A further means for increasing the service life is the use of a larger rolling-element bearing unit.

SUMMARY

The disclosure is directed to a rolling-element bearing unit that has at least one outer ring, at least one inner ring that includes at least one surface against which a seal element abuts and which is disposed at an axial end region of the rolling-element bearing unit, and a number of rolling elements that contact the outer ring and the inner ring.

The disclosed rolling-element bearing unit includes an elevation or projection that extends radially, starting from the surface against which the seal element abuts, toward the rolling elements, to a location farther radially outward than the surface. This projection defines a radially outward extension of the flange surface that is typically used to guide the axial end of a rolling element so that a greater surface area of the flange contacts the rolling element. According to this, an increased efficiency can be achieved. In particular a greater robustness with respect to transverse loads, such as during vehicle cornering, can be cost-effectively be achieved with the disclosed rolling-element bearing unit. This benefit can be obtained by changing a single part of known rolling-element bearing units that are already found in series production, used in particular as wheel-bearing units or pinion-bearing units, and specifically in particular for those having the design according to FIG. 1, which have a flange surface of an inner ring that is located at an axial end of the rolling-element bearing unit for guiding the rolling elements and which may be heavily loaded. Such transverse load situations can arise in many different applications, for example, for tapered roller bearings. The greater robustness is achieved in particular since in such transverse load situations, contact ellipses between rolling elements and the flange surface are not cut by a radial end of the flange surface and thus a lubricating film between the flange surface and the rolling elements is not reduced in its radial height due to the smaller flange height, so that no mixed friction occurs between the flange surface and the rolling elements, and thus also no heating, or deterioration of the lubricant caused by the heating. In particular a service life of the rolling-element bearing unit is extended by the avoidance of the deterioration of the lubricant.

Another aspect of the disclosure comprises a tapered rolling-element bearing unit having an outer ring and an inner ring having a raceway, the raceway having a first axial end having a first diameter rand a second axial end having a second diameter greater than the first diameter. The inner ring also has a guide flange at the second axial end of the raceway and a cylindrical wall on a side of the guide flange opposite from the raceway. A plurality of tapered rollers are mounted on the raceway, and each of the tapered rollers has an axial end surface at the second axial end of the raceway. Each of these axial end surfaces has an annular outer surface portion and a central portion recessed relative to the annular outer surface portion. The annular outer surfaces of the rollers contact the guide flange, the guide flange extends radially over a portion of the central recessed portion, and a maximum diameter of the guide flange is greater than a diameter of the cylindrical wall. The bearing unit may include a seal element extending from the outer ring to the cylindrical surface of the inner ring, and the inner ring may include a groove between the guide flange and the cylindrical wall.

Further advantages arise from the following description of the drawings. An exemplary embodiment of the disclosure is depicted in the drawings. The drawings, the description, and the claims contain numerous features in combination. The person skilled in the art will also advantageously consider the features individually and combine them into further meaningful combinations.

DETAILED DESCRIPTION

Figure 1:
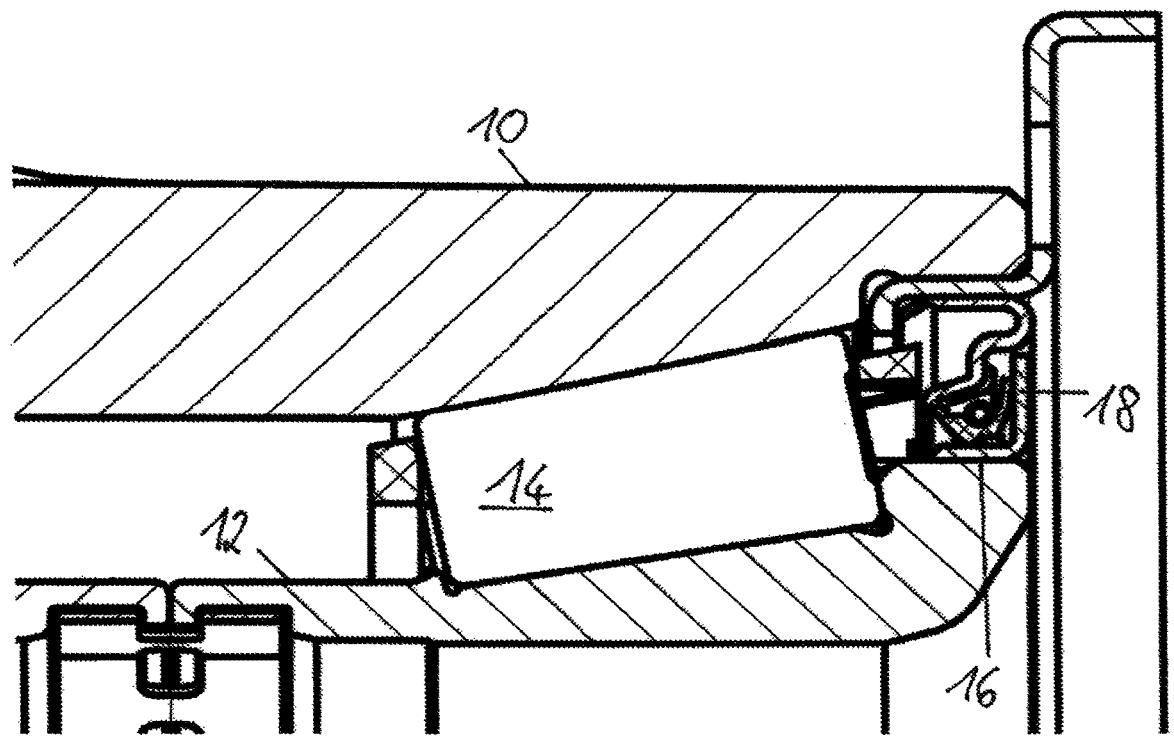
FIG. 1 is a partial axial section through a conventional rolling-element bearing unit.
Figure 2:
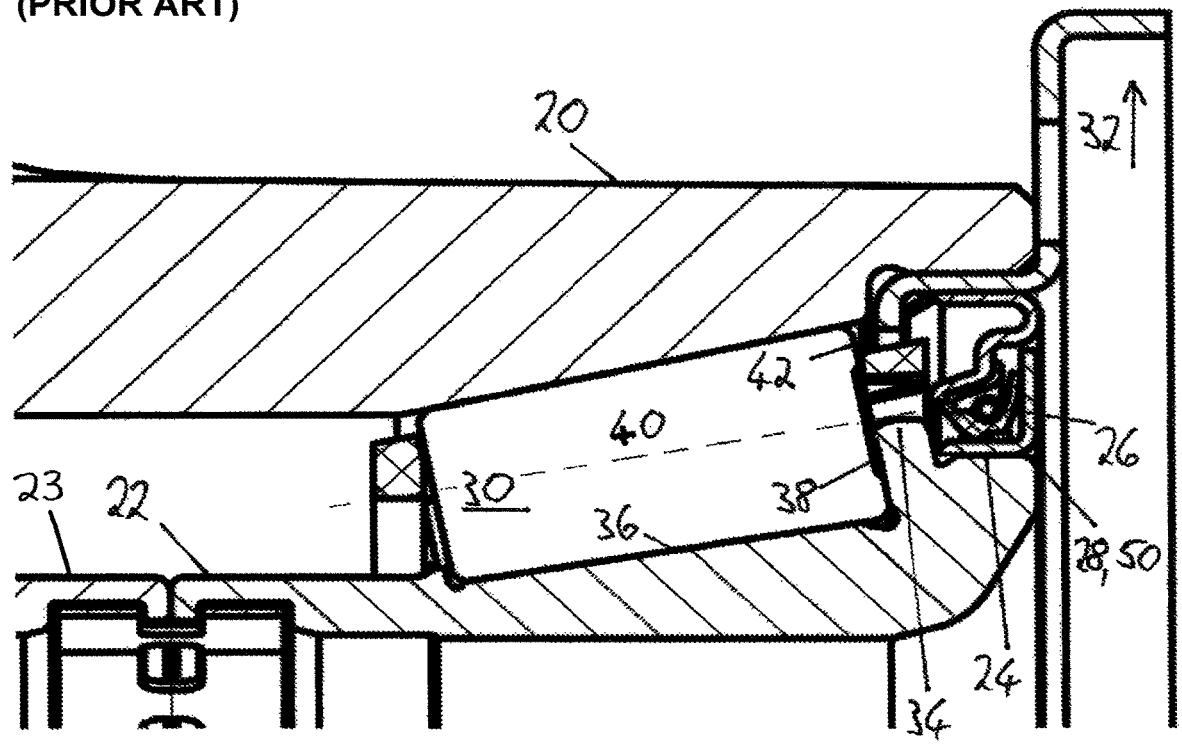
FIG. 2 is a partial axial section through a rolling-element bearing unit according to an embodiment of the present disclosure.
Figure 3:
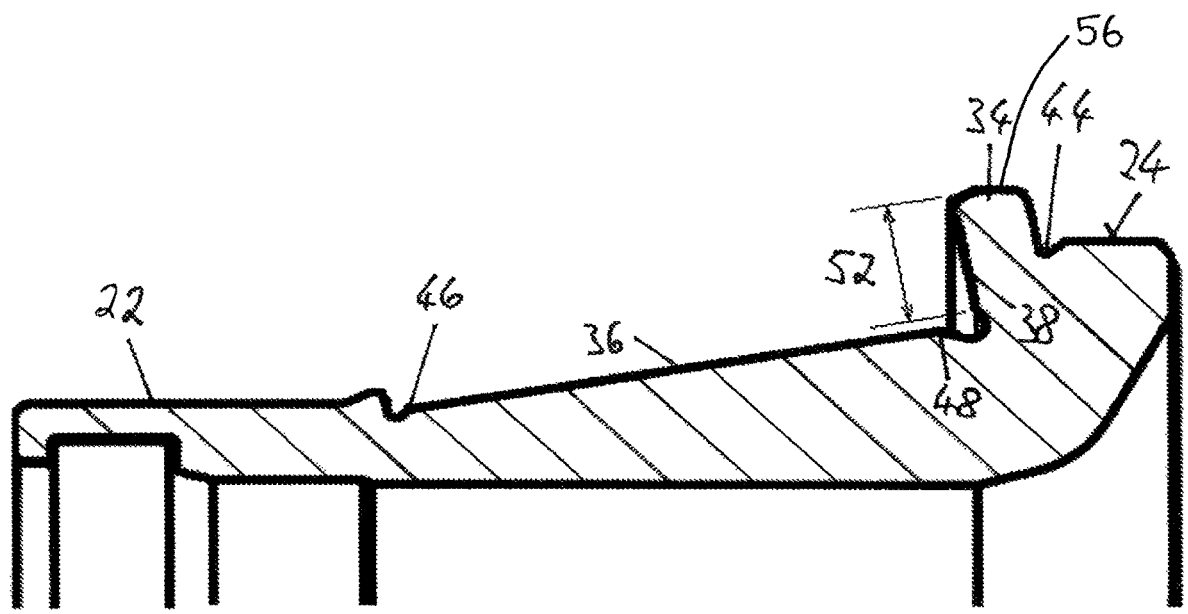
FIG. 3 is an axial section through an inner ring of the rolling-element bearing unit of FIG. 2.

FIG. 2 shows a partial section in the axial direction through a rolling-element bearing unit that includes an outer ring 20, an inner ring 22, and a number of rolling elements 30 that contact the outer ring 20 and the inner ring 22. The inner ring 22 includes a cylindrical surface 24 against which a seal element 26, which is configured as a metal-plate element, abuts and that is disposed at an axial region 28 of the rolling-element bearing unit (FIGS. 2 and 3). The inner ring 22 includes a projection 34 that extends in the radial direction 32 and that, starting from the surface 24, is inclined axially toward the rolling elements 30. The projection 34 extends farther outward in the radial direction 32 than the surface 24.

The outer ring 20, the inner ring 22, and the rolling elements 30 form a tapered roller bearing so that the inner ring 22 is a tapered-roller-bearing inner ring. The inner ring 22 includes a raceway 36 that is configured for rolling-on of the rolling elements 30, and the raceway 36 includes a first axial end 46 and a second axial end 48. A diameter of the second axial end 48 is greater than a diameter of the first axial end 46. The surface 24 is disposed radially outward of and directly at an axial end 50 of the inner ring 22. Furthermore, the surface 24 is disposed closer to the second axial end 48 than to the first axial end 46. The projection 34, starting from the surface 24, is angled axially away from the axial end 50. In addition, with respect to its axial position, the projection 34 is disposed between the surface 24 and the raceway 36 of the inner ring 22. An axial inner side of the projection 34 forms a guide surface 38 of the inner ring 22.

The rolling elements 30 are configured as tapered rollers. A distance between an axis of symmetry 40 of one of the rolling elements 30 and a radially outer surface 56 of the projection 34 is zero and thus less than a fraction of a radius of a wider side 42 of the tapered roller 30. The inner ring 22 includes a notch 44 between the surface 24 and the projection 34.

In a state wherein the guide surface 38 is loaded by the rolling elements 30 in a manner that corresponds to a load limit of the rolling-element bearing unit, all contact surfaces between the rolling elements 30 and the guide surface 38 are ellipses.

The rolling-element bearing unit includes a further inner ring 23 and further rolling elements (not shown) which, together with the outer ring, form a further tapered-roller bearing. This is part of the rolling-element bearing unit.

Figure 4:
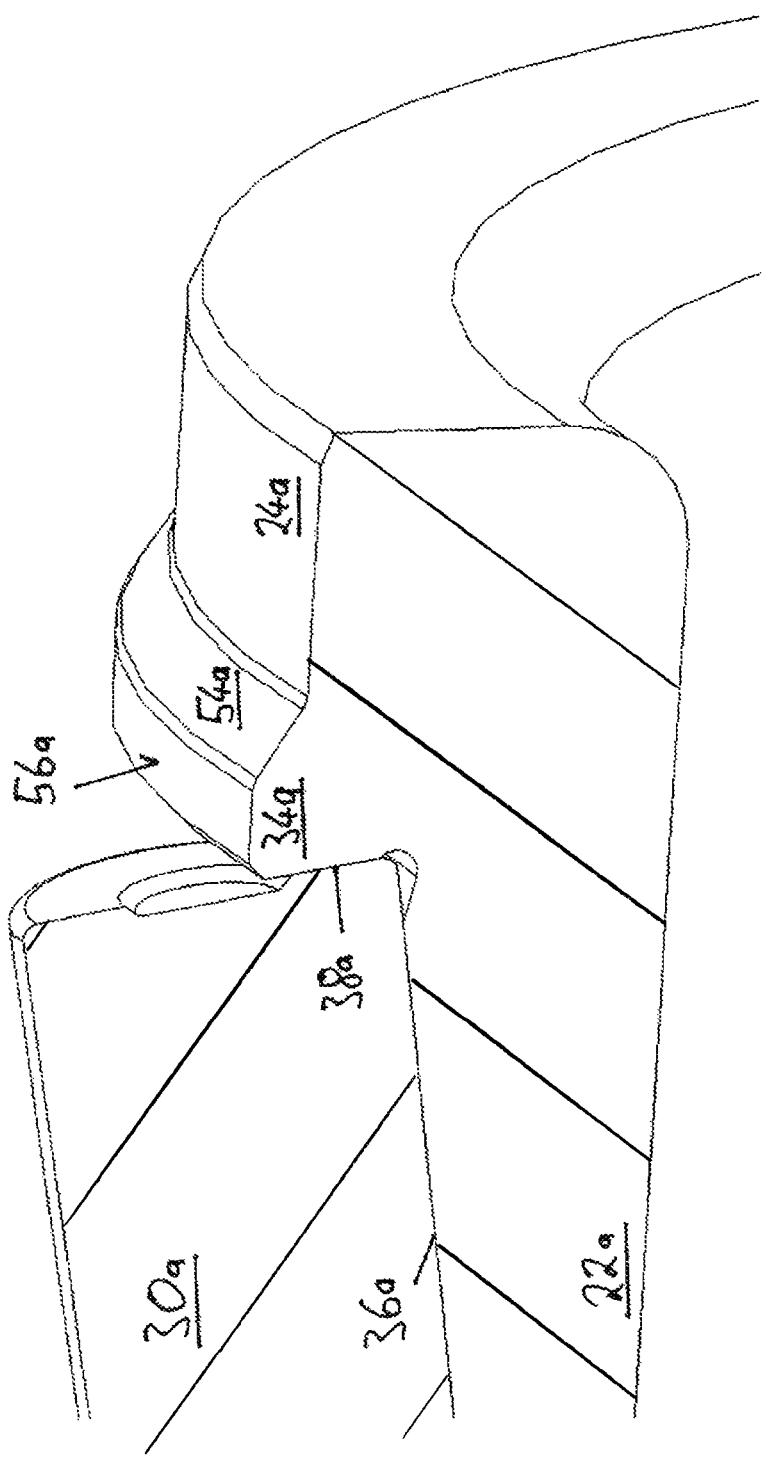
FIG. 4 is an axial section through an inner ring and a rolling element of a rolling-element bearing unit according to another embodiment of the disclosure.

An alternative exemplary embodiment is depicted in FIG. 4. Essentially identical components, features, and functions are generally numbered with the same reference numbers. However, to distinguish of the exemplary embodiments, the letter "a" is added to the reference numbers of the exemplary embodiment in FIG. 4. The following description is essentially limited to the differences to the exemplary embodiment in FIG. 2 and FIG. 3, wherein with respect to components, features, and functions remaining the same, reference can be made to the description of the exemplary embodiment in FIG. 2 and FIG. 3.

FIG. 4 shows an axial section through an inner ring 22a and a rolling element 30a of a further inventive rolling-element bearing unit. The inner ring 22a includes a projection 34a with a surface 56a that has a shape of an outer surface of a circular cylinder and abuts directly against a guide surface 38a up to a beveled edge. A surface 54a of the inner ring 22a is disposed axially between the surface 56a and the surface 24a. The surface 54a has the shape of an outer surface of a truncated cone. During the manufacturing of the inner ring 22a, the raceway 36a and the surface 24a can be ground simultaneously, which saves time and costs. The surface 54a is predominantly ground. In principle the surface 54a can also be non-ground. A ratio that is formed from an axial distance that the surface 56a has to the center of gravity of the inner ring, and a maximum axial length of the inner ring, is smaller than ⅕. An axial extension of the surface 56a is approximately equal to an axial extension of the surface 54a. Due to the presence of the surface 56a a jamming of the inner ring 22a in an installation guide can be avoided. In addition, wear of a conveying unit that includes the installation guide can be avoided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing unit comprising:
   at least one outer ring,
   at least one inner ring, the inner ring having a cylindrical surface at an axial end region of the rolling-element bearing unit configured to contact a seal element,
   a plurality of rolling elements between the at least one outer ring and the at least one inner ring, and
   a projection on the inner ring extending radially outward and axially away from the cylindrical surface, the projection having a guide surface facing the plurality of rolling elements, an outer cylindrical surface, and a truncated conical surface extending from the outer cylindrical surface of the projection to the cylindrical surface at the axial end region; and
   wherein the outer cylindrical surface of the projection has an axial extension and the truncated conical surface of the projection has an axial extension approximately equal to the axial extension of the outer cylindrical surface.

2. The rolling-element bearing unit according to claim 1, wherein the projection is located axially between the cylindrical surface of the axial end region and a raceway of the inner ring.

3. The rolling-element bearing unit according to claim 1, wherein, in a state in which the guide surface is loaded by the rolling elements in a load limit condition of the rolling-element bearing unit, all contact surfaces between the rolling elements and the guide surface are ellipses.

4. The rolling-element bearing unit according claim 1,
   wherein each of the rolling elements of the plurality of rolling elements is a tapered roller, and
   wherein a distance between an axis of symmetry of a given rolling element of the plurality of rolling elements, and the outer cylindrical surface of the projection is zero.

5. The rolling-element bearing unit according to claim 1,
   wherein each of the rolling elements of the plurality of rolling elements is a tapered roller having a first axial end and a second axial end, a diameter of the second axial end being greater than a diameter of the first axial end,
   wherein the second axial end of each roller includes an annular outer surface portion and a central portion recessed relative to the annular outer surface portion, the annular outer surface portion having a radial width, wherein a radial height of the guide surface is greater than the radial width of the annular outer surface portion of each roller and partially overlies the central portions of the rollers, and wherein the annular outer surface portions of the second axial ends of the plurality of rollers contact and are guided by the guide surface and wherein the central portions of the second axial ends of the plurality of rollers do not contact the guide surface.

6. The rolling-element bearing unit according to claim 5, including the seal element, the seal element extending from the outer ring to the cylindrical surface at the axial end region of the rolling-element bearing unit.

7. A tapered rolling-element bearing unit comprising:
an outer ring;
an inner ring having a raceway, the raceway having a first axial end having a first diameter and a second axial end having a second diameter greater than the first diameter; the inner ring having a projection providing a guide surface at the second axial end of the raceway; and the inner ring having a cylindrical surface on a side of the projection opposite from the raceway;
a plurality of tapered rollers mounted on the raceway, each of the tapered rollers having an axial end surface at the second axial end of the raceway, the axial end surface having an annular outer surface portion and a central portion recessed relative to the annular outer surface portion,
wherein the annular outer surfaces of the rollers contact the guide surface,
wherein the guide surface extends radially over a portion of the central recessed portion,
wherein a maximum diameter of the projection is greater than a diameter of the cylindrical surface;
wherein the projection further has an outer cylindrical surface and a truncated conical surface extending from the outer cylindrical surface of the projection to the cylindrical surface of the inner ring; and
wherein the outer cylindrical surface of the projection has an axial extension and the truncated conical surface of the projection has an axial extension approximately equal to the axial extension of the outer cylindrical surface.

8. The tapered-rolling element bearing according to claim 7, including a seal element extending from the outer ring to the cylindrical surface of the inner ring.

9. A tapered-roller-bearing inner ring comprising:
a first axial side and a second axial side;
a cylindrical surface at the second axial end configured to support a seal element;
a raceway configured to support a plurality of tapered rollers, the raceway including a first axial end axially spaced from a second axial end, a diameter of the second axial end being greater than a diameter of the first axial end,
a projection extending axially from and radially outwardly from a location between the second axial end of the raceway and the cylindrical surface, the projection having an outer cylindrical surface and a truncated conical surface extending from the outer cylindrical surface of the projection to the cylindrical surface of the inner ring; and
wherein the outer cylindrical surface of the projection has an axial extension and the truncated conical surface of the projection has an axial extension approximately equal to the axial extension of the outer cylindrical surface.

10. The tapered-roller-bearing inner ring according to claim 9, wherein an axial inner side of the projection forms a guide surface of the tapered-roller-bearing inner ring.

* * * * *